(12) United States Patent
Ford

(10) Patent No.: US 6,832,625 B2
(45) Date of Patent: Dec. 21, 2004

(54) ELECTRICALLY OPERABLE VALVE ASSEMBLY HAVING AN INTEGRAL PRESSURE REGULATOR

(76) Inventor: Michael Brent Ford, 2716 Rio Vista, St. George, UT (US) 84790

( * ) Notice: Subject to any disclaimer, the term of this patent is extended or adjusted under 35 U.S.C. 154(b) by 172 days.

(21) Appl. No.: 10/122,879

(22) Filed: Apr. 11, 2002

(65) Prior Publication Data

US 2003/0192596 A1 Oct. 16, 2003

(51) Int. Cl.$^7$ ............................................. G05D 16/08
(52) U.S. Cl. .................. 137/495; 137/505.26; 137/554; 137/599.13; 137/614.2
(58) Field of Search .................................. 137/495, 505, 137/505.14, 484.8, 624.12, 599.13

(56) References Cited

U.S. PATENT DOCUMENTS

| | | | | |
|---|---|---|---|---|
| 1,307,337 A | * | 6/1919 | Bassett | 137/599.13 |
| 2,026,704 A | * | 1/1936 | Petroe | 137/495 |
| 3,481,363 A | * | 12/1969 | Ray | 137/495 |
| 4,060,370 A | * | 11/1977 | Fleer | 137/495 |
| 4,589,435 A | * | 5/1986 | Aldrich | 137/102 |
| 5,004,014 A | * | 4/1991 | Bender | 137/624.12 |
| 5,913,236 A | * | 6/1999 | Wodeslavsky | 137/624.12 |

* cited by examiner

Primary Examiner—Stephen M. Hepperle
(74) Attorney, Agent, or Firm—Andrew M. Harris; Harry M. Weiss; Weiss, Moy & Harris, P.C.

(57) ABSTRACT

An electrically operable valve assembly having an integral pressure regulator provides ease of installation and compact packaging for a water supply control system. The valve assembly is particularly useful for systems that control household water supplies to prevent flooding, but is also useful in other applications such as agricultural and industrial systems where water pressure determined water flow volume must be predicted accurately. The valve may also incorporate a flow meter having a positive flow characteristic permitting determination of very low flow rate flow and the valve may incorporate a manual control. All of the controls and features are integrable within a compact package that occupies essentially the same volume and piping space as a conventional electrically operable valve.

24 Claims, 3 Drawing Sheets

ELECTRICALLY OPERABLE VALVE ASSEMBLY HAVING AN INTEGRAL PRESSURE REGULATOR

RELATED APPLICATIONS

The present application is related to U.S. patent application Ser. No. 10/122,880 entitled "METHOD AND SYSTEM FOR CONTROLLING A HOUSEHOLD WATER SUPPLY" filed concurrently with this application, issued as U.S. Pat. No. 6,691,724, and also to U.S. patent application Ser. No. 10/122,877 entitled "POSITIVE FLOW METER" also filed concurrently with this application. The specifications of both of the above-referenced applications are incorporated herein by reference.

BACKGROUND OF THE INVENTION

1. Field of the Invention

The present invention relates generally to liquid control valves, and more specifically, to an electrically operable valve assembly for controlling a water supply.

2. Background of the Invention

Water supply valves for household use are generally mechanical valves, although electrically operable sprinkler control valves are common. Electrically operable valves, if used on household water supplies are typically motor driven valves that use rotation to move a gate that shuts off water flow in the same manner as a mechanically operated valve.

Pressure regulators are sometimes installed on the household water supply in areas where the pressure may exceed desirable operating levels for household appliances and other fixtures. Sprinkler systems also have pressure ratings that may be exceeded if the household water supply pressure rises too high due to external conditions at a city water distribution grid, for example.

A pressure regulator requires in-line installation space and additional assembly time when used with a valve. Therefore, it would be desirable to provide an electrically operable valve and a pressure regulator that do not require additional assembly time and in-line space.

SUMMARY OF THE INVENTION

The above objective of providing an electrically operable valve and a pressure regulator that do not require additional in-line space and assembly time is achieved in an electrically operable valve assembly having an integral pressure regulator. The valve and regulator are incorporated within one housing, and the pressure regulating mechanism may form part of the valve closure mechanism. A flow meter may also be integrated within the housing as well as a manual cutoff mechanism, providing multiple functions within one compact housing.

The foregoing and other objectives, features, and advantages of the invention will be apparent from the following, more particular, description of the preferred embodiment of the invention, as illustrated in the accompanying drawings.

DETAILED DESCRIPTION OF THE PREFERRED EMBODIMENTS

1. Electrically Operable Valve

Figures 1, 1A:
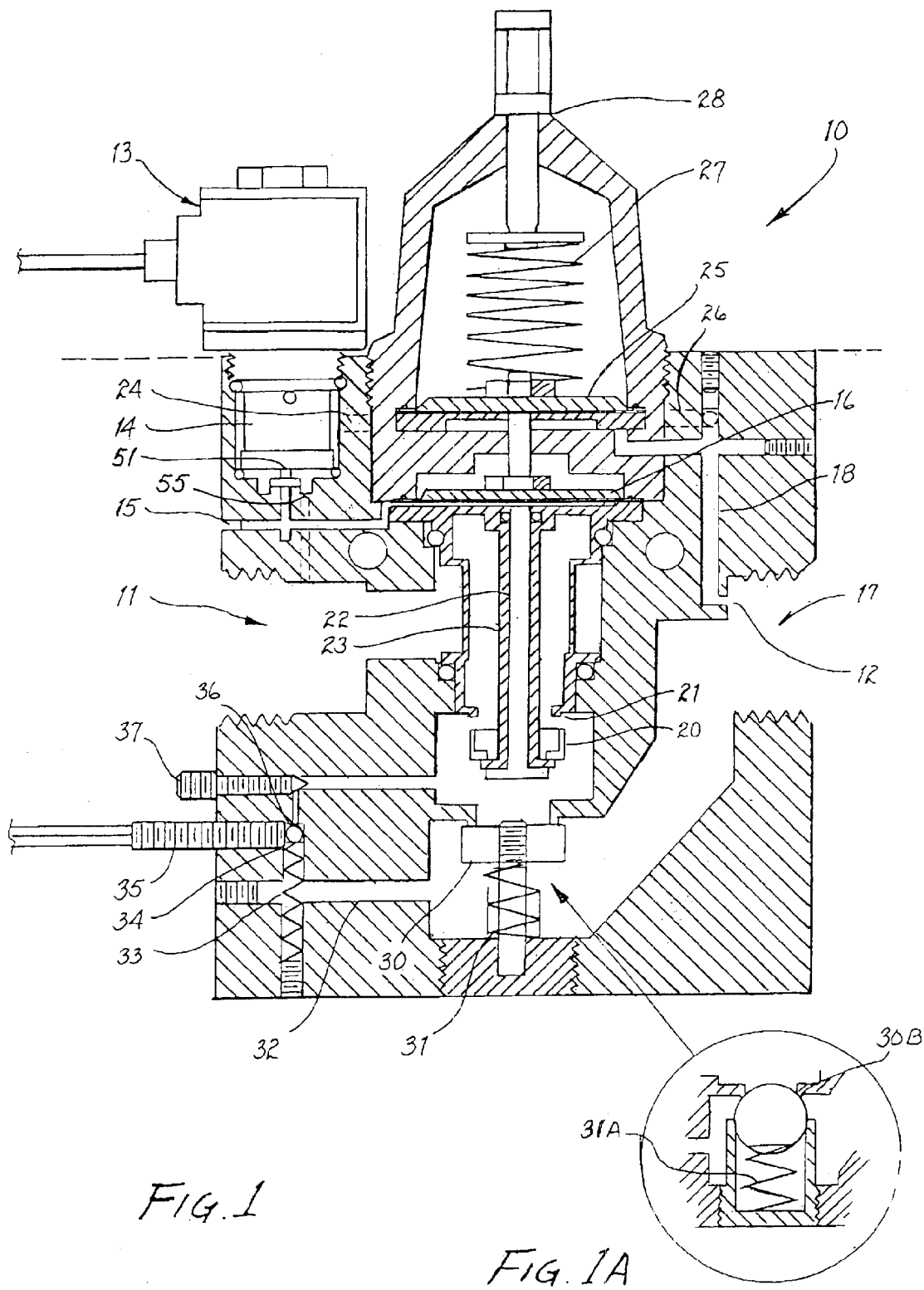
FIG. 1 is a mechanical drawing depicting a cross-section of an electrically operable valve in accordance with an embodiment of the invention.
FIG. 1A is a mechanical drawing depicting a cross-section of an alternative backflow prevention device that may be incorporated within the electrically operable valve of FIG. 1.

Referring now to the figures and in particular to FIG. 1, an electrically operable valve assembly 10 in accordance with an embodiment of the present invention is depicted. A water supply inlet 11 provides a connection to a water supply system such as a city water main connection. A household water supply outlet 12 provides connection to a household water supply system. In the depicted embodiment, electrically operable valve assembly 10 includes a backflow preventor, which prevents any backflow of water to the water supply. The backflow preventor comprises a piston 30 (or plunger) and spring 31 that prevent the flow of water when back water pressure moves piston 30 to compress spring 31. Alternatively, as shown in FIG. 1A, a ball 30B may be used in place of piston 30, with the ball mounted above a spring 31A. The backflow preventor device is closely coupled to the operation of an integral flow meter, which will be described in further detail below.

Figure 2:
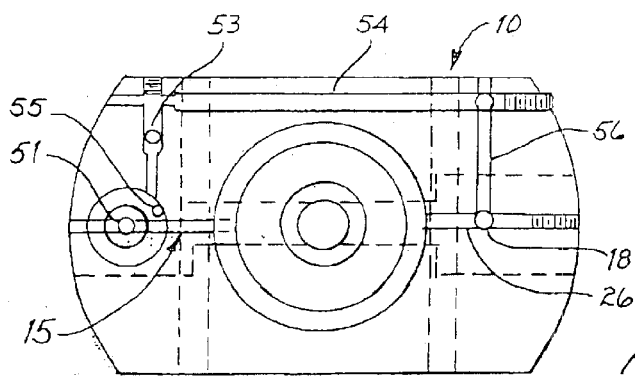
FIG. 2 is a mechanical drawing depicting a top view of an electrically operable valve in accordance with an embodiment of the invention.

Control of electrically operable valve assembly 10 is provided by a piston-mounted gasket assembly 20 that shuts off the main water channel from water supply inlet 11 to household water supply outlet 12. Gasket assembly 20 is slidably mounted on an outer piston 23 that surrounds an inner piston 22. Gasket assembly 20 acts as a plunger when outer piston 23 or inner piston 22 is raised, shutting off the main water channel. Outer piston 23 is mechanically coupled to a lower diaphragm 16. Flow through electrically operable valve assembly 10 is stopped by water pressure on the lower side of lower diaphragm 16 causing outer piston 23 to move gasket assembly 20 to force the gasket against seat 21. The water pressure on the lower side of lower diaphragm 16 is supplied by a channel 15 that receives flow when a piston 14 coupled to electrical solenoid 13 is in the raised position. Referring momentarily to FIG. 2, channel 15 receives flow from central aperture 51 which in turn receives flow from peripheral aperture 55 when piston 14 is raised (an o-ring or washer is provided at the end of piston 14 to provide a seal). Peripheral aperture 55 is coupled to water supply inlet 11 and thus provides a source of pressure higher than household water supply outlet 12.

Since the only path to the lower side of lower diaphragm 16 is provided through channel 15, when piston 14 is lowered, water pressure must be relieved through channel 15 to open electrically operable valve 10. Piston 14 is hollow, and provides a connection from channel 15 (via central aperture 51 of FIG. 2) to a side port channel 24 that extends around the diaphragm assemblies and connects to an exit channel 26 on the outlet side 12 of electrically operable valve 10. Referring to FIG. 2, the path of channel 24 connects through channels 54 and 56 to channel 17 and venturi 18 of FIG. 1. Flow in the main channel of electrically operable valve 10 causes a reduced pressure at venturi 18, pulling water through the above-described path from the top side of lower diaphragm 16 as the valve closes. A stop ball 53 disposed within channel 54 prevents backflow through this path.

Solenoid 13 may be a latching-type solenoid, permitting a momentary pulse to operate electrically operable valve assembly 10. A latching solenoid is preferred for extending solenoid life and for reducing power consumption and noise, but a standard solenoid may be preferred if it is desirable to cut-off water flow when electrical supply to the assembly fails.

2. Pressure Regulator

Upper diaphragm 25 provides a pressure regulator integrated within electrically operable valve assembly 10. A channel 17 connects to a venturi 18 that couples the household water outlet side 12 of electrically operable valve assembly 10 to the lower side of upper diaphragm 25. The pressure supplied through channel 17 to upper diaphragm 25 acts against spring 27 that is manually adjustable via turnscrew 28. When the outlet pressure exceeds a level as set by turnscrew 28 adjustment, upper diaphragm 25 lifts inner piston 22, raising gasket assembly 20, restricting the flow through the main channel of electrically operable valve assembly 10. Thus, a pressure feedback mechanism is established that regulates the pressure at outlet 12.

3. Flow Meter

A flow meter may be implemented within electrically operable valve assembly 10 by a sensor 35 mounted near bypass channel 32 inlet. A ball 34 is mounted within bypass channel 32 and may be made of a magnetized material or ferromagnetic material for use with a hall effect sensor. Sensor 35 may be a hall effect sensor, inductive sensor or other suitable sensor for detecting the proximity of ball 34. The output indication from sensor 35 may be a continuous analog reading of the position of ball 34, or a binary flow/no-flow indication.

The flow meter implemented by ball 34 and sensor 35 is a positive flow meter in that any flow through valve assembly 10 will move ball 34 away from sensor 35, providing measurement of flows much lower than flow rates detectable with conventional flow meters for household water supply applications, which typically cannot detect flows below 0.5 gallons per minute. The positive flow meter permits detection of low volume water leaks that may cause damage to a structure without registering a flow at a flow meter detection system. Since any flow through valve assembly 10 requires a pressure drop between water supply inlet 11 and household water supply outlet 12, ball 34 will move away from sensor 35 as flow through bypass channel 32. Spring 33 has a very low spring constant and very little force on ball 34 is required to compress spring 33. When no flow (or back flow begins to occur), ball 34 will be forced by spring 33 against seat 36, effectively closing bypass channel 32 to prevent backflow leakage. Setscrew 37 permits adjustment of the cross-section of bypass channel 32, providing a means for adjusting the sensitivity of the flow meter at the factory or after installation. As the channel cross-section decreases, the amount of force compressing spring 33 for a given flow rate will increase, thus increasing the sensitivity of the flow meter.

Spring 31 is designed so that gasket assembly 30 will not open the main valve channel until the sensor 35 detects positive flow and therefore any flow through electrically operable valve assembly 10 will result in an indication from sensor 35. The above operation is accomplished by making the spring constant of spring 31 such that ball 34 will travel past sensor 35 before spring 31 is compressed to open the main valve channel.

4. Alternative Electrically Operable Valve and Flow Meter 1

Figure 3:
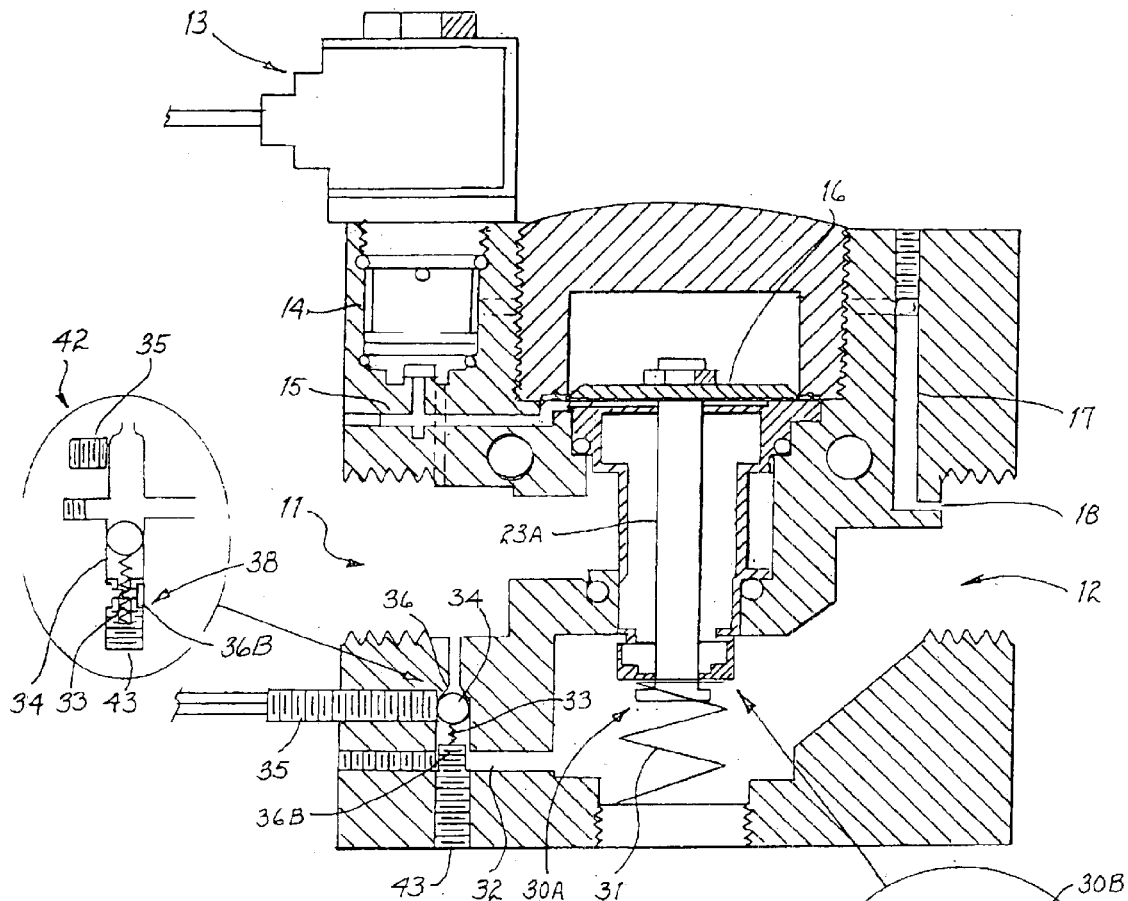
FIG. 3 is a mechanical drawing depicting a cross-section of an electrically operable valve in accordance with an alternative embodiment of the invention.
Figure 3A:
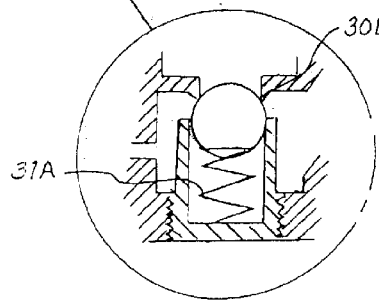
FIG. 3A is a mechanical drawing depicting a cross-section of an alternative backflow prevention device that may be incorporated within the electrically operable valve of FIG. 3.

Referring now to FIGS. 3 and 3A, an electrically operable valve and flow meter in accordance with an alternative embodiment of the invention is depicted. In this embodiment, the pressure regulator is removed from the embodiment depicted in FIGS. 1 and 2, simplifying the structure of the assembly. In the depiction, like reference numbers are used to indicate the corresponding components, the operation of which is described above for the embodiment of FIGS. 1 and 2. Therefore, only differences between the assemblies will be described.

Piston 23A is a single sleeve piston operating in similar fashion to outer piston 23 of FIG. 1. Piston 23A does not have to be hollow, as inner piston 22 of FIG. 1 was provided to implement pressure regulation and is therefore not needed in the present embodiment. Piston 23A is slidably coupled to gasket assembly 30A, which is operated by diaphragm 16 or backpressure from water supply outlet 12, eliminating the need for the separate gasket assemblies 30 and 20 of FIG. 1. The sliding mount of gasket assembly 30A in conjunction with spring 31 provides closure of the main channel at the onset of flow until ball 34 has seated against seat 36, providing proper operation of the flow meter within the bypass channel. However, since forward pressure can be applied through channel 32 when the valve is closed (channel 32 in the embodiment of FIG. 1 is effectively closed by gasket assembly 20 when the valve is closed), a second seat 36B is provided for ball 34 in the reverse flow direction, preventing leakage through the flow meter channel 32 when the valve is closed. The bottom of seat 36B is provided by a threaded insert 43 in the depicted embodiment. In order for ball 34 to move when a forward flow is generated through the valve assembly, water must flow channel 32. Forward flow is provided by a channel passing through threaded insert 43. Balloon detail 42 depicts the above-described channel 38 that is cross-drilled through threaded insert 43 to connect with the hole that is drilled to retain spring 33. When the valve is closed, water can flow through channel 38 from the center of spring 33, until ball 34 seats at bottom seat 36B.

5. Alternative Electrically Operable Valve 2

Figure 4:
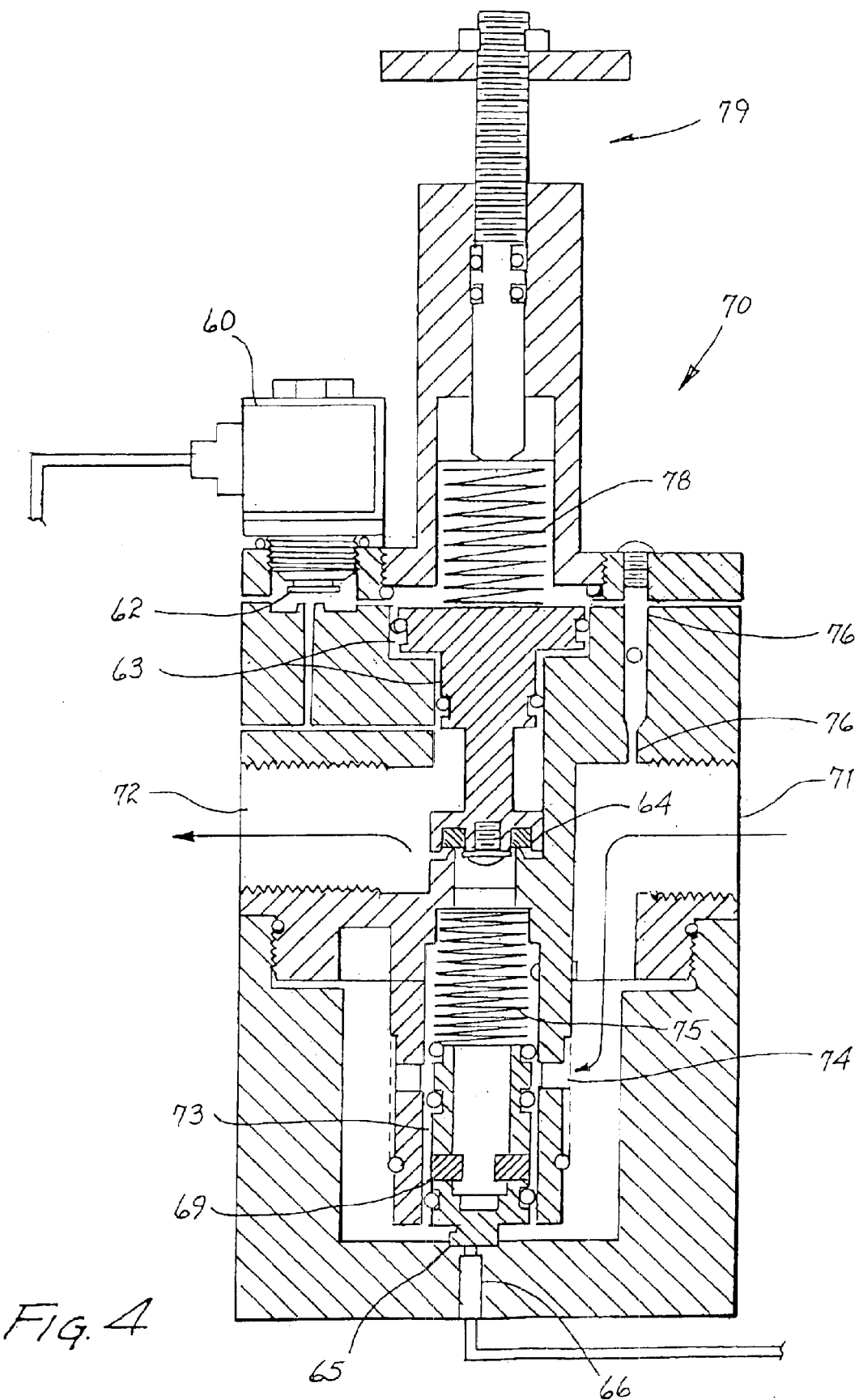
FIG. 4 is a mechanical drawing depicting a cross-section of an electrically operable valve in accordance with another alternative embodiment of the invention.

Referring now to FIG. 4, an electrically operable valve 70, in accordance with an alternative embodiment of the invention is depicted. The alternative embodiment incorporates a backflow prevention device within valve 70 and a manual cut-off shaft 79 that operates the piston 63 used for electrically actuating valve 70. As in the first embodiment, piston 63 is driven by a spring 78 that provides an initial compressive force against piston 63 providing a pressure reduction via the operation of piston 63. The compressive force is overcome by a pressure drop between a water supply inlet 71 and a household water supply outlet 72. A bypass channel 76 is provided from water supply inlet 71 to household water supply outlet 72 providing equalization of pressure from water supply inlet 71 to household water supply outlet, when an o-ring 62 mounted on a shaft of a solenoid 60 is in a retracted position.

When solenoid 60 is activated, o-ring 62 seats against the housing of valve 70, closing bypass channel 76 and permitting a pressure drop to develop across the main valve channel. The pressure drop moves piston 63 upward, compressing spring 78, providing a pressure-regulated flow through valve 70. As described above for the preferred embodiment, solenoid 60 may be a momentary latching type solenoid or a standard solenoid.

A second piston 73 provides a backflow prevention device and may alternatively be used for pressure regulation or may be used in combination with piston 63 and spring 78 to provide pressure regulation. Holes 74 through the housing cylinder containing piston 73 permit water to flow from the outside channel to piston 73. Pressure in the forward direction of flow causes piston 73 to move upward, compressing spring 75 and moving piston so that channels 69 align with holes 74, permitting water to flow through the central void of piston 73 through to household water supply outlet 72. When flow reverses through valve 70, piston 73 moves downward, decompressing spring 75 and seating o-rings above and below holes 74, shutting off backflow through valve 70.

6. Alternative Flow Meter 2

A flow meter is provided in the alternative embodiment of FIG. 4 by a sensor 66 integrated at the bottom of the valve housing. A disc or button 65 may be made of a magnetized material or ferromagnetic material and sensed by proximity to sensor 66. When flow from water supply inlet 71 to household water supply outlet 72 occurs, piston 73 will move upward, retracting disc or button 65 from sensor 66, providing an indication of flow through valve 70. As described above for the first embodiment, output from sensor 66 may be a continuous indication of the position of disc or button 65 providing an indication of flow level or a flow/no-flow indication may be provided by sensor 66.

The embodiments of the invention described above disclose an electrically operable valve with pressure regulation, backflow prevention and a flow meter-incorporated within one housing and using common mechanisms between the valve and pressure regulator. Both embodiments provide a flow meter capable of registering very low flow rates, so that household leak detection may be accomplished for very low flow rate leaks. The valve is suitable for use within the system and method described in the above-incorporated patent application "METHOD AND SYSTEM FOR CONTROLLING A HOUSEHOLD WATER SUPPLY", wherein the valve will provide a compact solution having very high sensitivity to water supply system leaks.

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. An electrically operable valve assembly for controlling a household water supply, said valve assembly comprising:
    a water supply inlet;
    a water supply outlet;
    a pressure regulator for reducing a water pressure level of said water supply inlet;
    a piston disposed between said water supply inlet and said water supply outlet for controlling a flow of said household water supply, wherein said piston is opened by a pressure drop introduced in the flow of said water supply;
    a bypass channel extending between said water supply inlet and said water supply outlet for reducing said pressure drop, whereby said piston is allowed to close;
    an electrically operable valve element for controlling a flow of said household water supply by interrupting flow through said bypass channel;
    a housing for containing said pressure regulator, said piston, said bypass channel and said electrically operable valve element, whereby said electrically operable valve assembly valve assembly comprises an integral assembly attachable between a water supply via said water supply inlet and a household water system via said household water supply outlet; and
    a ball disposed within said bypass channel, and wherein said bypass channel defines a chamber having a diameter larger than a diameter of said ball wherein said ball may move and an inlet having a diameter smaller than said diameter of said ball whereby said ball may seat against said inlet, blocking a reverse flow through said bypass channel from said water supply outlet to said water supply inlet.

2. The electrically operable valve assembly of claim 1, further comprising a spring mechanically coupled to said piston for resisting movement of said piston in response to said pressure drop, and wherein said spring is set to a predetermined compression for producing a regulated pressure drop.

3. The electrically operable valve assembly of claim 2, further comprising an adjustment shaft for setting said predetermined compression, providing manual adjustment of said regulated pressure drop.

4. The electrically operable valve assembly of claim 2, wherein the electrically operable valve element further comprises:
    a solenoid; and
    a solenoid piston mechanically coupled to said solenoid for blocking said bypass channel, whereby flow may proceed through said main channel due to a pressure drop compressing said spring.

5. The electrically operable valve assembly of claim 1, further comprising a backflow preventer within said housing for preventing a flow from said household water supply outlet to said water supply inlet.

6. The electrically operable valve assembly of claim 5, wherein said backflow preventer comprises:
    a second piston for controlling a flow of said household water supply, wherein said second piston is opened in a forward flow direction by a pressure drop introduced in the flow of said water supply, and wherein said second piston seats against a seat located between said water supply inlet and said water supply outlet when said reverse flow begins, whereby said reverse flow is stopped; and
    a spring for moving said second piston.

7. The electrically operable valve assembly of claim 1, further comprising a flow meter integral to said housing.

8. The electrically operable valve assembly of claim 7, wherein said flow meter comprises a sensor for detecting a position of a movable indicator disposed within a channel of said electrically operable valve assembly, whereby an electrical output is provided indicating a flow through said electrically operable valve assembly.

9. The electrically operable valve assembly of claim 8, further comprising:
    a backflow preventor; and
    a second bypass channel bypassing said backflow preventor, and wherein said channel is said second bypass channel, said movable indicator is a ball disposed within said second bypass channel, and wherein said second bypass channel includes a seat whereby said ball seals said second bypass channel against reverse flow.

10. An electrically operable valve assembly for controlling a household water supply, said valve assembly
    a water supply inlet;
    a household water supply outlet;
    a plunger for reducing a flow through said valve assembly;
    a pressure regulating diaphragm mechanically coupled to said plunger for controlling a position of said plunger;

a control diaphragm coupled to said plunger for opening and closing said plunger;

an electrical control element for controlling a water pressure supplied to said control diaphragm; and a housing for containing said pressure regulator and said electrically operable valve element, whereby said electrically operable valve assembly valve assembly comprises an integral assembly attachable between a water supply via said water supply inlet and a household water system via said household water supply outlet.

11. The electrically operable valve assembly of claim 10, wherein said control diaphragm and said pressure regulating diaphragm are coupled to said plunger by a concentric piston and sleeve.

12. The electrically operable valve assembly of claim 11, wherein said sleeve is coupled to said pressure regulating diaphragm and said piston is disposed within said sleeve and coupled to said control diaphragm.

13. The electrically operable valve assembly of claim 10, wherein said electrical control element is a solenoid for controlling flow from said water supply inlet to a side of said control diaphragm.

14. The electrically operable valve assembly of claim 13, wherein said solenoid opens a second channel for venting pressure from said side of said diaphragm when said flow from said water supply inlet is cut-off.

15. The electrically operable valve assembly of claim 14, further comprising a venturi within a region of said water supply outlet coupled to said second channel for withdrawing water from said side of said diaphragm.

16. The electrically operable valve assembly of claim 10, further comprising a second plunger for preventing a backflow of water from said household water supply outlet to said water supply inlet.

17. The electrically operable valve assembly of claim 16, further comprising:

a bypass channel around said second plunger; and a movable indicator disposed within said bypass channel for providing a flow indication.

18. The electrically operable valve assembly of claim 17, wherein said bypass channel further comprises a seat for preventing a backflow around said moveable indicator.

19. The electrically operable valve assembly of claim 17, further comprising a sensor for detecting a position of said movable indicator, whereby an electrical output indicating a flow through said bypass channel is provided.

20. The electrically operable valve assembly of claim 10, further comprising a bypass channel extending between said water supply inlet and said household water supply outlet for reducing a pressure drop between said water supply inlet and said household water supply outlet, whereby said plunger is allowed to close.

21. The electrically operable valve assembly of claim 10, wherein said electrical control element further controls a flow through said bypass channel, whereby said pressure drop is reduced in response to an action of said electrical control element.

22. The electrically operable valve assembly of claim 20, further comprising a ball disposed within said bypass channel, and wherein said bypass channel defines a chamber having a diameter larger than a diameter of said ball wherein said ball may move and an inlet having a diameter smaller than said diameter of said ball whereby said ball may seat against said inlet, blocking a reverse flow through said bypass channel from said household water supply outlet to said water supply inlet.

23. The electrically operable valve assembly of claim 10, further comprising:

a bypass channel bypassing at least a portion of a primary channel of said electrically operable valve assembly; and a movable indicator disposed within said bypass channel for providing a flow indication.

24. The electrically operable valve assembly of claim 23, further comprising a sensor for detecting a position of said movable indicator, whereby an electrical output indicating a flow through said bypass channel is provided.

* * * * *